(12) United States Patent
Sarferaz

(10) Patent No.: US 9,922,085 B2
(45) Date of Patent: Mar. 20, 2018

(54) TEMPLATE BASED GENERATION OF CROSS VIEWS

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 14/813,900

(22) Filed: Jul. 30, 2015

(65) Prior Publication Data

US 2017/0031983 A1 Feb. 2, 2017

(51) Int. Cl.
*G06F 17/30* (2006.01)
*G06F 17/24* (2006.01)

(52) U.S. Cl.
CPC ...... *G06F 17/30451* (2013.01); *G06F 17/248* (2013.01); *G06F 17/30294* (2013.01); *G06F 17/30418* (2013.01)

(58) Field of Classification Search
None
See application file for complete search history.

(56) References Cited

U.S. PATENT DOCUMENTS

| 2014/0074539 A1* | 3/2014 | Doering ........... G06Q 10/06315 705/7.25 |
| 2015/0120785 A1* | 4/2015 | Kemmler .......... G06F 17/30292 707/803 |
| 2016/0156661 A1* | 6/2016 | Nagaratnam ........... H04L 63/20 726/1 |
| 2016/0294652 A1* | 10/2016 | Kamenz ................. H04L 43/06 |

\* cited by examiner

*Primary Examiner* — Son T Hoang
(74) *Attorney, Agent, or Firm* — Jones Day

(57) ABSTRACT

The present disclosure relates to systems and methods for generating a virtual data model of data from one or more source systems, where the exact number of each type of source system is not known. Templates for each source system type may be defined and then explicit views may be generated for each source system based on configuration data provided by a customer.

20 Claims, 5 Drawing Sheets

TEMPLATE BASED GENERATION OF CROSS VIEWS

COPYRIGHT NOTICE

Portions of the disclosure of this patent document contain material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

The purpose of cross-system analytics is to consolidate, transform and clean data from source systems and thereby provide a central and consistent view for reporting and analyzing data within an organization.

When data is exchanged among several source systems, it is very likely that the data does not fit together from a business or technical context. When the data is exchanged, functionality is needed to bring the different data sets together to create one common data foundation (i.e. core data model).

Very often a core data model is defined numerous times for different purposes. In many cases, this is because minor metadata must be added. For example technology solutions for integration, user interface, analytics or transactions unnecessarily require their own data models. This increases the total cost of ownership (TCO) as the same content must be provided several times. Due to the incompatible metamodels, cross topics like user interface integration, extensibility or authorization, must be solved various times. This results in high TCO and encounters consumption of solutions by customers.

In case of cross-system analytics, application data from one or more source systems is replicated into separate database schemas in a target system, one schema for each source system. Local views may be defined on top of those external application database tables. Local views of different source systems may be combined into cross views for implementation of cross-system analytics scenarios Although there may be cross-system analytics scenarios where the number of the involved systems of same type is already known during design time (e.g. exactly one SAP enterprise resource planning (ERP) system and one SAP customer relationship management (CRM) system are relevant), other scenarios exist where the role of the involved systems is known in advance (e.g. SAP ERP) but not the number of each type of system. This may be because the number of systems of a particular system type may depend on the explicit customer system landscapes (e.g. n×SAP ERP). However this information is necessary for the definition of cross CDS views in order to provide cross-system scenarios that must be applicable for different customer environments without the knowledge of explicit customer system landscapes.

Different options exist to master the challenge of not having any knowledge about the explicit customer system landscape while still needing to define cross views. For cross-system scenarios, respective cross views could be defined and subsequently extended by customer to their specific system landscapes. However, the extensibility concept of an involved database environment is not powerful enough to allow enhancements of cross views by customers or partners. Customers could also copy or modify delivered cross views, however the customer would then be cut off from bug-fixes or new releases of the views delivered by the service provider.

Therefore, the inventors perceive a need to develop a solution for defining cross views when the system landscape is not known without sacrificing any of the flexibility of having a virtual data model.

DETAILED DESCRIPTION

Embodiments of the present disclosure provide systems and methods for defining cross views for a minimum number of involved systems, based on the number of system types involved. The most likely system types may be used as templates. Based on such templates, system landscape specific cross views would be generated at the customer side. Configuration data of explicit customer system landscapes are used to generate landscape specific cross views.

Figure 1:
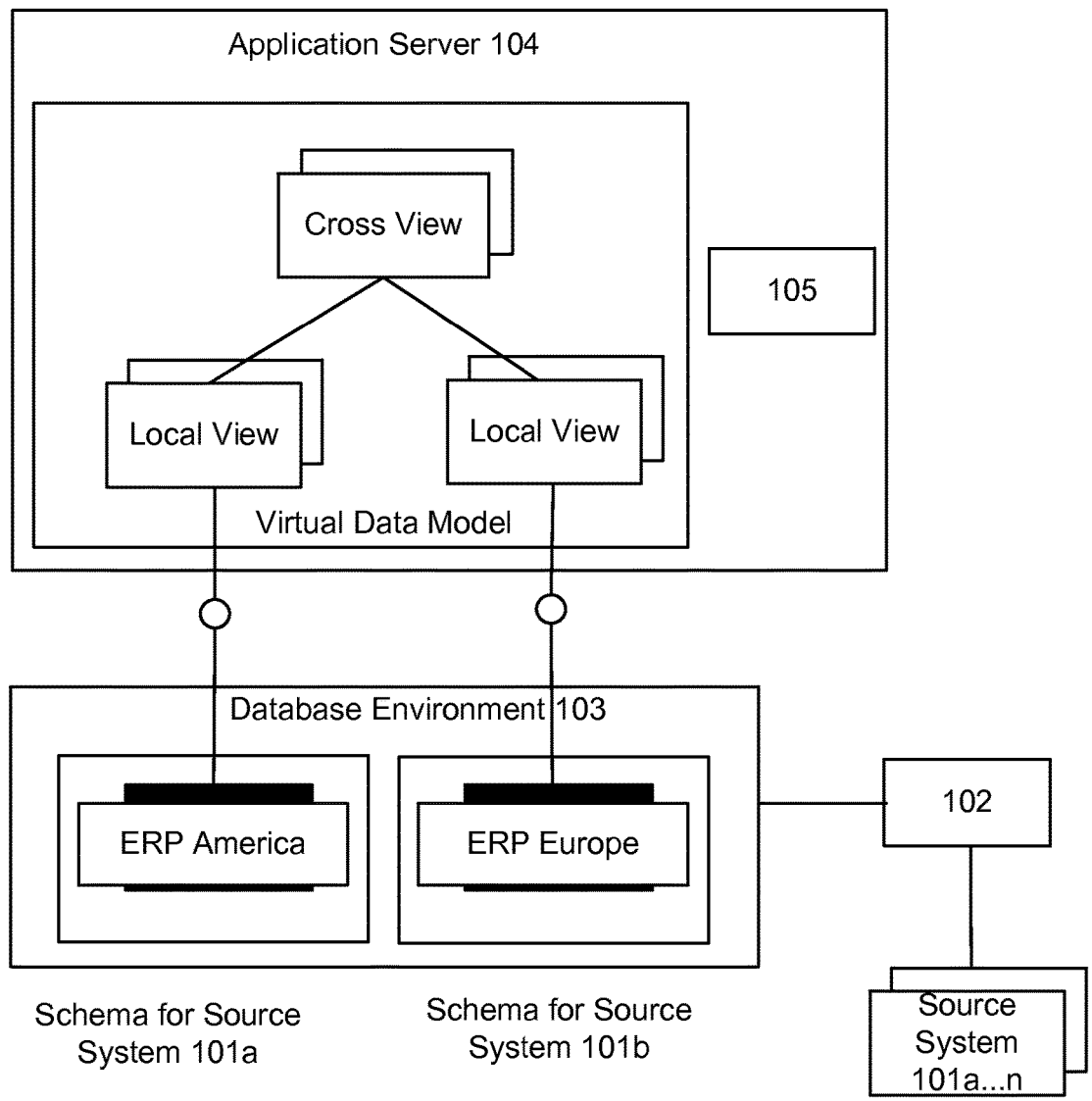
FIG. 1 illustrates a system architecture diagram of a system 100 where embodiments of the present disclosure may find application.

FIG. 1 illustrates a system architecture diagram of the system 100 according to an embodiment of the present invention. System 100 may include one or more source systems 101*aa* . . . *n*, replication unit 102, database environment 103 and application server 104. System 100 may be deployed in a variety of environments, such as within a cloud system, on a user premises, or in a privately managed cloud. In an embodiment, system 100 may represent operation of a database system/application server instance that is in use (for example, by a client).

Source system 101*a* may include a database having one or more application database tables (not shown). Source system 101*a* may detect changes or modifications to the database tables. Source system 101*a* may use data base triggers to detect changes or modifications to the database tables. In an embodiment, source system 101*a* may respond to a table being selected for replication by automatically creating data base triggers and related change logs to track and log changes for each table within source system 101*a*. Database triggers may be processes that are stored in a database of source system 101*a* and are executed in response to a triggering event, such as when a table associated with the database is modified. For example, a database trigger may allow source system 101*a* to detect the execution of structured query language (SQL) statements such as "insert", "delete" or "update" on a table. In response, a read module (not shown) of source system 101*a* can read the modified data from the application database tables and transfer the modified data to replication unit 102. In an embodiment, replication unit 102 may contain a read module which can read and transfer the modified data to itself from the source system 101*a* in response to a database trigger.

Upon receiving modified data, replication unit 102 may replicate the modified data to the target system. Replication unit 102 may replicate data from one or more source systems to the database environment 103. Replication unit 102 may perform an initial load of data from a source system 101a to a database environment prior to replicating changes or modifications to the data from the source system 101a to the database environment 103. Subsequently, replication unit 102 may utilize a read module (not shown) to retrieve data from application tables of the source systems in response to an indication that a change in the relevant tables of the source system has occurred (such as a database trigger). In an embodiment, replication unit 102 may utilize configuration parameters to load and replicate data from the source system. Configuration parameters may contain information about the source system, the database environment and the relevant connections between the two. Configuration parameters may be specified by a user.

Based on the configuration parameters, replication unit 102 may load and replicate data from one or more source systems to a database environment (1:1 or N:1 replication) or load and replicate data from one source system to up to four database environments (1:N replication). In an embodiment, replication unit 102 can replicate data from each different source system into a respective database environment schema.

Replication unit 102 may utilize delta logging when replicating data. Using delta logging may enable replication unit 102 to replicate only the modifications to a table, instead of replicating the entire table again to the database environment. In this way, replication unit 102 can greatly reduce data redundancy. Replication unit 102 may be any suitable infrastructure component, such as a replication server for example.

In an embodiment, replication unit 102 may replicate data in real time, or may schedule the replication by time interval.

In an embodiment, system 100 may include a preprocessing unit (not shown). The preprocessing unit may harmonize data when heterogeneous data is present between the source system and database environment. Heterogeneous data may include data that is structural and not semantically consistent. The preprocessing unit may perform staging, duplicate elimination and/or key mapping in order to harmonize the data prior to replication.

Replication unit 102 may transfer the data to be replicated into application data base tables within the one or more respective schemas of database environment 103. The application database tables may represent a persistency layer of the database environment 103. Database environment 103 can access data locally and dynamically once it has been replicated from the source system.

Database environment 103 may include databases to store replicated information. Database environment 103 may be any suitable data storage mechanism. By way of non-limiting example, database environment 103 may be an SAP HANA database. Each database may include one or more schemas for each source system. Each schema may include one or more application database tables. The application database tables may represent a persistency layer of database environment 103. Database environment 103 can access data locally and dynamically once it has been replicated from the source system. Database environment 103 and replication unit 102 may communicate with each other via a database connection. In an embodiment, replication unit 102 may replicate data from each external source system to a respective schema of database environment 103.

Figure 2A:
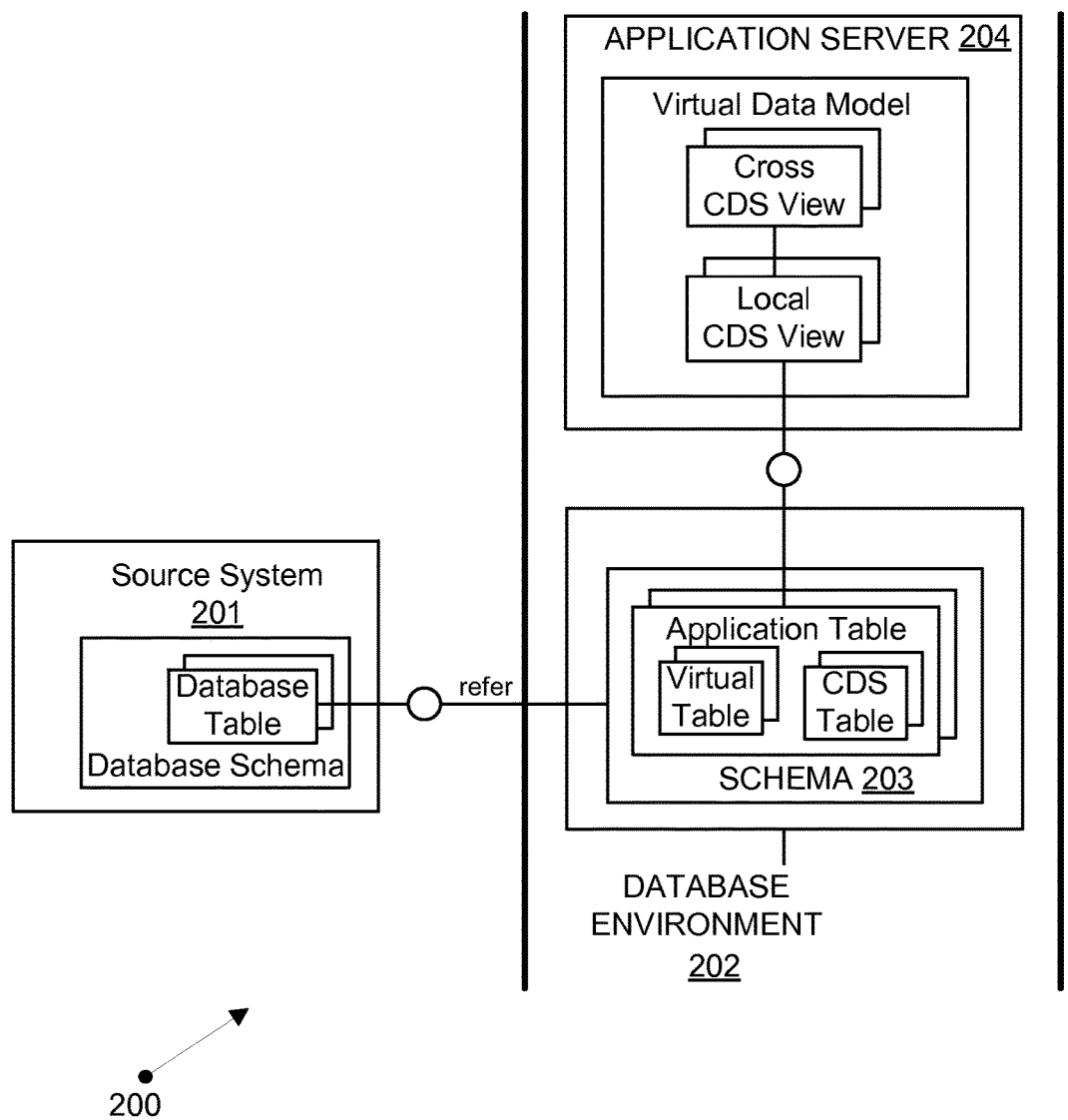
FIG. 2A illustrates a system architecture diagram of a system 200 according to an embodiment of the present disclosure.

In an embodiment, system 100 may utilize a remote data access method such as smart data access to transfer data. FIG. 2A illustrates a system architecture diagram of a system 400 that may utilize smart data access to replicate data according to an embodiment of the present disclosure. Database environment 202 may include one or more virtual tables within each schema 203. Each virtual table may refer to a database table within a source system 201 remotely. The virtual table may then be used as the basis for generation of local views, cross views and analytic functionality by an application server 204 as described herein.

Figure 2B:
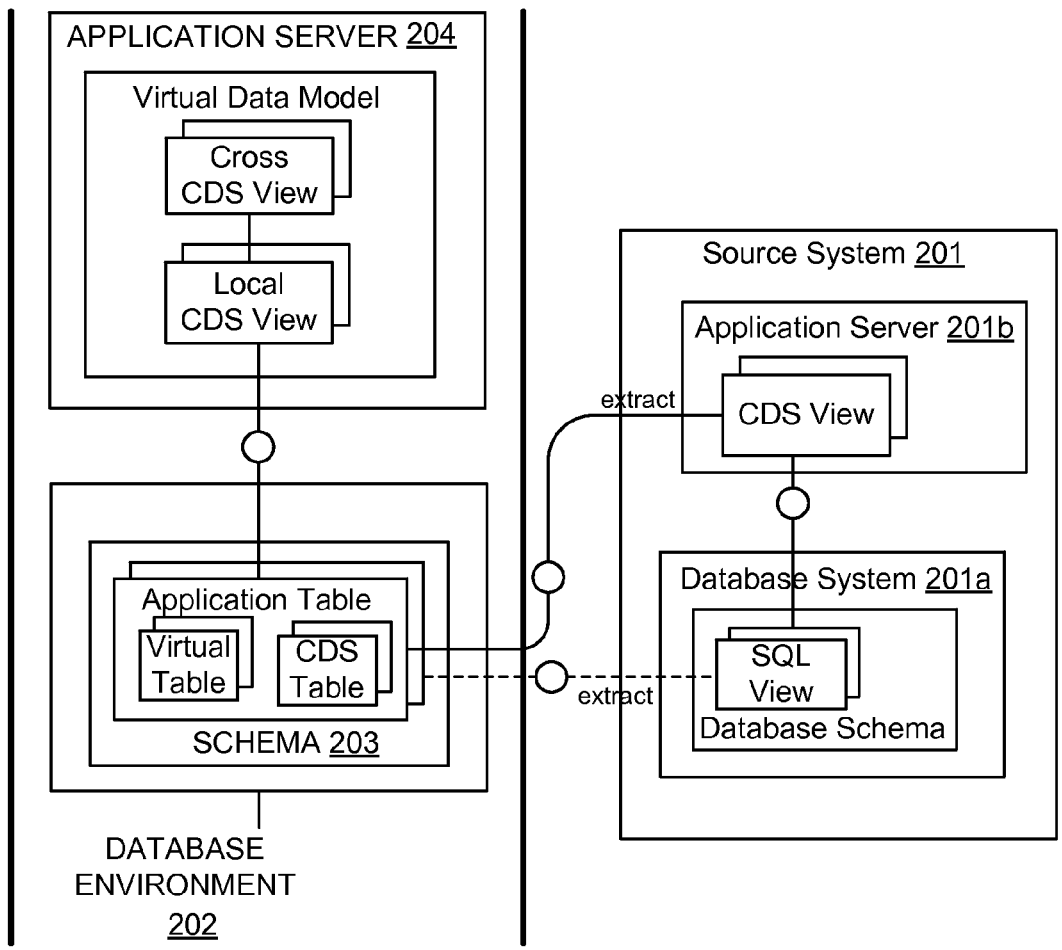
FIG. 2B illustrates a system architecture diagram of a system 200 according to another embodiment of the present disclosure.

In an embodiment, system 100 may utilize an extraction technique such as CDS extraction to replicate data from a source system. FIG. 2B illustrates a system architecture diagram of a system that may utilize extraction to replicate data according to an embodiment of the present disclosure. Source system 201 may include a database environment 201a and application server instance 201b. Application server 201b may generate local views of the database system 201a. Application server 201b may mark certain views for replication using an extraction indicator to mark certain views. Database environment 202 may remotely select all views having the extraction indicator and persist the results locally. Database environment 202 may then cache the views and application server 204 may generate local views on top of the views being persisted within database environment 202. Application server 204 may use the local views based on the persisted views to generate cross views, and enable analytic functionality.

Returning to FIG. 1, application server 104 may define a set of views for each schema respectively. Each view may be based on one or more application tables from the respective schema. Application server 104 may then define a cross view integrating views for one or more schemas to create a virtual data model (VDM).

Application server 104 may contain analytical engine 105. Analytical engine 105 may consume the views that make up the VDM and perform analytical functions using the VDM. Analytical engine 105 may consume the views and evaluate the metadata of the views, especially the analytical annotations, to enable analytic functionality. Metadata may include behavioral components of the data, the manner in which data is aggregated and how data is displayed in the user interface among other aspects. Specific analytic functionality may be in the form of application logic. Analytical engine 105 may receive application logic in the form of SQL script, or any other declarative and optimizable language for expressing application logic. Application logic may represent user defined functionality such as cross view defining, statistical analysis and hierarchy handling. Analytical engine 105 can compile the application logic into a calculation model, which can be accessed in the same manner as a database model. Therefore, the calculation model may be a kind of parameterized view capable of reuse. Examples of analytical functions that analytic engine 105 may undertake include statistical algorithms, planning and other special operators.

In an embodiment, the database environment 104 and application server 105 may act as an "empty" central hub, in order to facilitate large volumes of data from large numbers of source systems. Many instances of a database environment 104 and application server 105 may already have a large amount of throughput from many source systems. For example, a client system may have a large number of users and a large amount of data within the database environment, as well as a large number of applications running on the application server. Because of this, systems in use such as the client system in the example above cannot handle a large number of external systems. By providing an empty instance of a database environment and application server to act in the role of a central hub, analytic engine 106 may perform analytics for a large number of source systems and high data volume.

Figure 3:
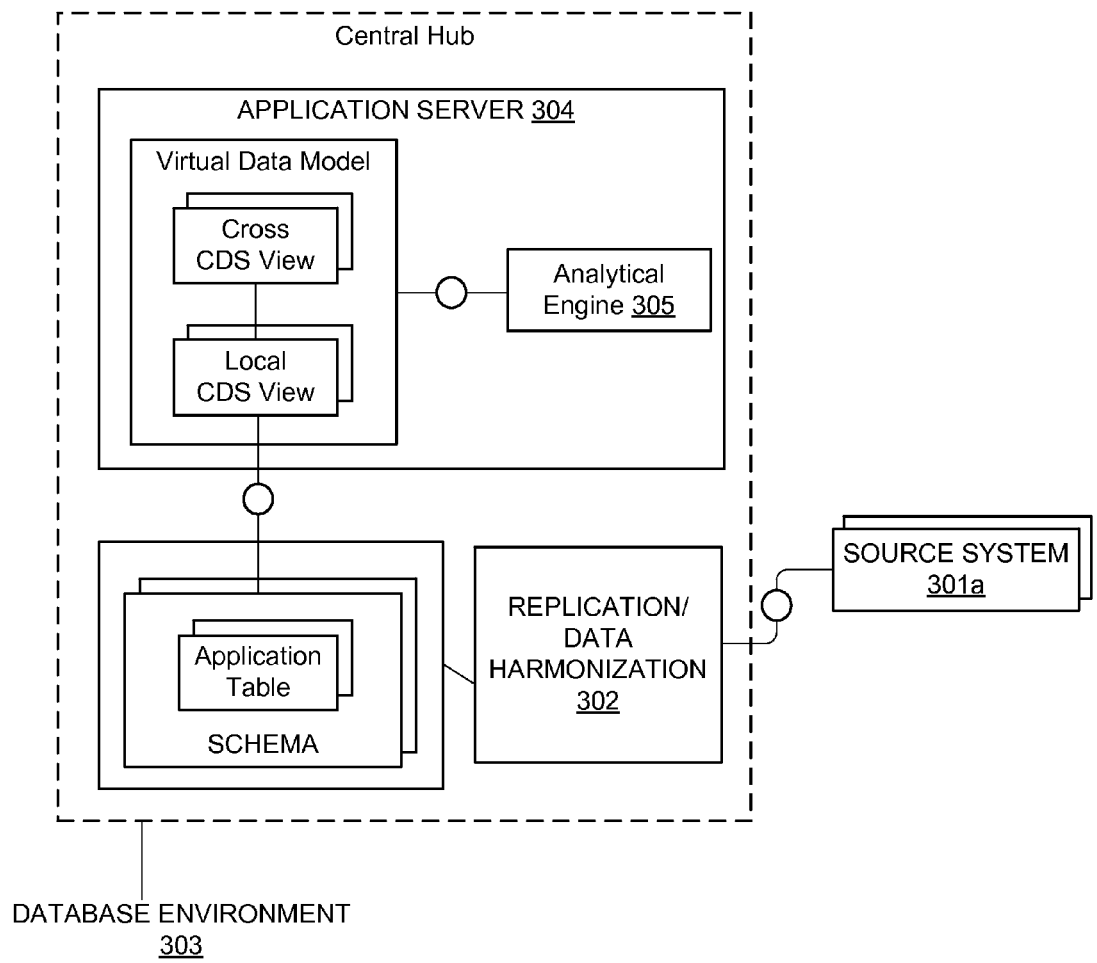
FIG. 3 illustrates a system architecture diagram of a system 300 according to another embodiment of the present disclosure.

FIG. 3 illustrates a system 300 in accordance with an embodiment of the present disclosure. In particular, FIG. 3 illustrates the system 300 in a central hub configuration. System 300 may include one or more source systems 301a . . . n, replication/data harmonization unit 302, database environment 303, application server 304 and analytical engine 305. System 300 may be the basis for cross-system analytics in scenarios involving a large number of source systems and high data volume. System 300 may replicate data as discussed herein. System 300 may also define views and cross views as well as perform data analytics as discussed herein. System 300 may re-use views as well as data models and previous calculations (the previous calculations may form a type of parameterized view which can be reused as discussed further herein).

Returning to FIG. 1, in an embodiment, application server 104 may define a template for a cross view. Application server 104 may use application logic to define a cross view template. Application logic may be in the form of any declarative and/or optimizable language for expressing application logic (e.g. SQL script). By way of non-limiting example, application server 104 may use a UNION operation to define the cross view. If a cross view results from a UNION operation or similar operation, application server 104 may have knowledge of the involved system types (e.g. ERP or CRM) in advance. In an embodiment, application server 104 may not know an explicit number of systems for each system type. Thus, application server 104 may define a template for the cross view based on a minimum number of involved system types.

In an embodiment, application server 104 may use application logic to create associations or an explicit join clause between schemas. By way of non-limiting example, such a function may be a JOIN operation. Associations may define relationships between entities. In an embodiment, application server may specify associations by adding an element to a source entity with an association type that points to a target entity complemented by optional information regarding cardinality, which keys to use, additional filter conditions, up to a complete join condition. If a cross view template results from a JOIN operation or similar, application server 104 may have knowledge of the type and number of involved systems at design time. Thus, application server 104 may completely define the explicit cross view without the need for additional templates.

Application server 104 may utilize configuration data for a particular customer's system landscape to determine a number of source systems of each involved system type and logical systems for each source system.

In an embodiment, application server 104 may use table functions to define templates for multiple schemas of the same type. In an embodiment, the configuration data may indicate when a system landscape involves multiple systems of the same type. Table functions may be data dictionary objects that are defined via data dictionary language (DDL) sources. In an embodiment, in contrast to local views, table functions are database dependent and represent native SQL script functions. Application server 104 may implement table functions using application server managed database procedure (AMDP) classes. Application server 104 may implement AMDP classes at the database level in SQL Script. The SQL script of an AMDP class may refer to a particular schema. In this way, application server 104 may enable access to multiple schemas of the same system type, and thus, may allow for the definition of templates and explicit views for multiple schemas of the same system type.

In an embodiment, different templates for table functions and their respective AMDP implementation may be required depending on the system types involved (e.g. SAP ERP or Oracle ERP). This is because the same semantic information may, for example, have been stored in different database tables depending on the system type. In order to handle accessing data from multiple database schemas application server 104 must maintain the system-specific schemas. Thus, depending on the configuration data, application server 104 may generate templates for multiple table functions and AMDP implementations.

Application server 104 may generate a table function and/or AMDP class template for each respective source system. Application server 104 may define templates for cross views, table functions and AMDP implementations with existing development tools. Application server 104 may also define templates for table functions and AMDP implementations with the same application logic and application logic structure as a view.

Application server 104 may use the configuration data as well as previously defined templates to generate, for each involved system, explicit AMDP classes and/or table functions. Application server 104 may activate each explicit AMDP class and/or table function so that they can be used immediately.

In an embodiment, application server 104 may use an SQL function such as a "UNION" operation to define a cross view. In an embodiment, application server 104 may access data from one system instance per system type (e.g. ERP or CRM) and subsequently may generate an explicit AMDP class based on the configuration data and the AMDP class template. In an embodiment, application server 104 may replace the SQL Script coding reference to the database schema within the template with appropriate SQL script based on the configuration data.

In an embodiment, application server 104 may access data from multiple system instances per system type. Thus, application server 104 may generate a table function and AMDP implementation for each respective instance based on the configuration data.

Application server 104 may generate the explicit cross system view based on the explicit local views, table functions and AMDP implementations.

Figure 4:
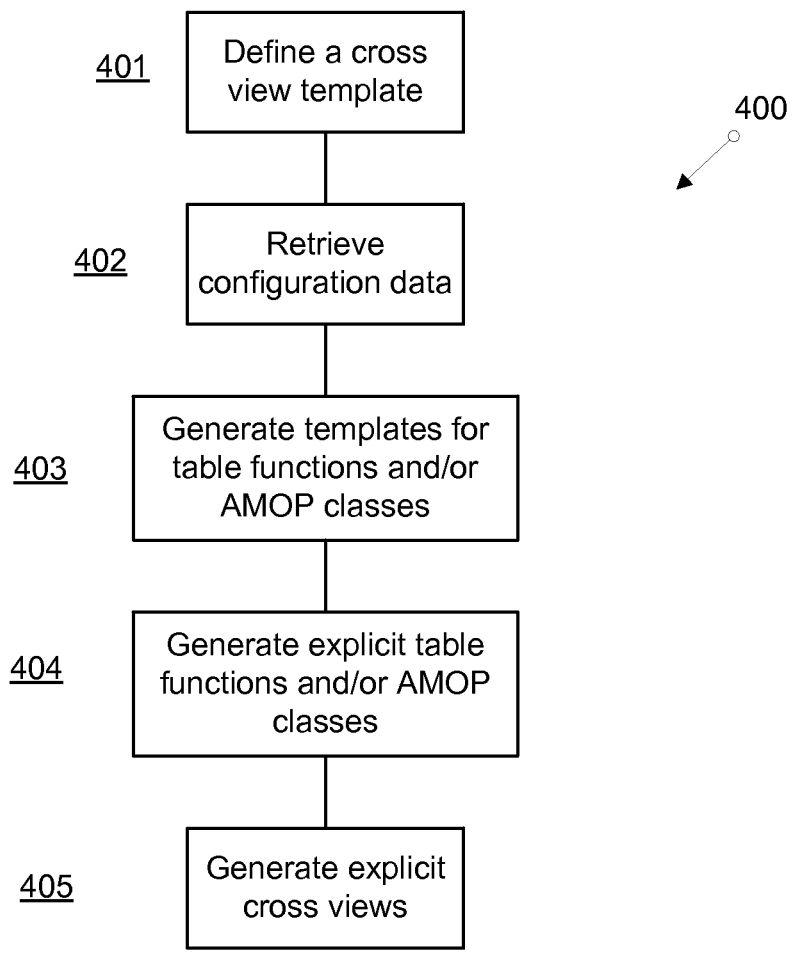
FIG. 4 illustrates a flow diagram of a method 400 according to an embodiment of the present disclosure.

FIG. 4 is a flow diagram illustrating a method 400 according to an embodiment of the present disclosure.

At box 401, method 400 may define a template for a cross view. Method 400 may use application logic to define a cross view. Application logic may be in the form of any declarative and/or optimizable language for expressing application logic (e.g. SQL script). By way of non-limiting example, method 400 may use a UNION operation to define the cross view. If a cross view results from a UNION operation or similar operation, method 400 may have knowledge of the involved system types (e.g. ERP or CRM) in advance. In an embodiment, method 400 may not know an explicit number of systems for each system type. Thus, method 400 may define a template for the cross view based on a minimum number of involved system types. By way of non-limiting example, the SQL code below shows an SQL implementation of a cross view template.

"DEFINE VIEW CrossFlightData AS SELECT * FROM SAPSchema1.ERP_SFlight UNION ALL SELECT * FROM SAPSchema2.CRM_SFlight . . . "

As can be seen, method 400 may define templates with prefixes (i.e. "SAPSchema1.ERP"), which may act as placeholders for customer specific implementation data (i.e. configuration data). In an embodiment, a user may select a cross view template by specifying the number of involved system types.

In an embodiment, method 400 may use application logic to create associations or an explicit join clause between schemas. By way of non-limiting example, such a function may be a JOIN operation. Associations may define relationships between entities. In an embodiment, method 400 may specify associations by adding an element to a source entity with an association type that points to a target entity complemented by optional information regarding cardinality, which keys to use, additional filter conditions, up to a complete join condition. If a cross view template results from a JOIN operation or similar, method 400 may have knowledge of the type and number of involved systems at design time. Thus, method 400 may completely define the explicit cross view without the need for additional templates.

At box 402, method 400 may utilize configuration data for a particular customer's system landscape to determine a number of source systems of each involved system type and logical systems for each source system.

At box 403, method 400 may generate a table function and/or AMDP class template for each respective source system. Method 400 may define templates for cross views, table functions and AMDP implementations with existing development tools. Method 400 may define templates for table functions and AMDP implementations with the same application logic and application logic structure as a view. As those templates can be activated and transported, method 400 may use standard lifecycle management tools for delivery, bug-fixing or updating. In an embodiment, method 400 may use the generation approach for stacked cross views. Thus, method 400 may generate respective cross views, table functions and AMDP classes for each layer of the stack.

In an embodiment, method 400 may use table functions to define templates for multiple schemas of the same type. In an embodiment, the configuration data may indicate when a system landscape involves multiple systems of the same type. Table functions may be data dictionary objects that are defined via data dictionary language (DDL) sources. In an embodiment, in contrast to local views, table functions are database dependent and represent native SQL script functions. Method 400 may implement table functions using application server managed database procedure (AMDP) classes. Method 400 may implement AMDP classes at the database level in SQL Script. The SQL script of an AMDP class may refer to a particular schema. In this way, method 400 may enable access to multiple schemas of the same system type, and thus, may allow for the definition of templates and explicit views for multiple schemas of the same system type.

In an embodiment, the SQL script in a table function or AMDP class template may include a prefix. A prefix may act as a placeholder which may be replaced with customer specific configuration data. In an embodiment, method 400 may generate SQL script referring to a particular schema based on the configuration data.

As discussed herein, method 400 may define templates with SQL script using prefixes, which may act as placeholders for customer specific implementation data (i.e. configuration data).

By way of non-limiting example, method 400 may generate a template for an AMDP class as shown in the example SQL script below:

```
CLASS cl_amdp DEFINITION ... .
PUBLIC SECTION. INTERFACES if_amdp_marker_hdb.
TYPES tt_db_tab TYPE TABLE OF db_tab WITH EMPTY KEY.
METHODS db_func
IMPORTING VALUE(im_param) TYPE param_type
RETURNING VALUE(rt_db_tab) TYPE tt_db_tab.
...
ENDCLASS.
CLASS cl_my_amdp IMPLEMENTATION.
METHOD db_func BY DATABASE FUNCTION FOR HDB
LANGUAGE
SQLSCRIPT OPTIONS READ-ONLY USING db_tab.
-- SQLScript Code referring database schema, e.g.
-- SELECT * FROM SAPSchema.SFLIGHT
...
return ... ;
ENDMETHOD.
...
ENDCLASS.
```

The code above illustrates how method 400 may use prefixes such as "SAPSchema.SFLIGHT" as well as application logic to refer to the database schema corresponding to a source system (referred to in the code as "SQL script code referring database schema") to create an AMDP class template. Method 400 may generate an explicit AMDP class based on the AMDP class template and the configuration data as discussed herein.

By way of non-limiting example, method 400 may generate the template for a table function as shown in the example SQL script below:

```
[DEFINE] TABLE FUNCTION tab_func_name
[parameter_list]
RETURNS { return_list
| return_struct }
IMPLEMENTED BY METHOD
cl_amdp=>implementing_method [;]
```

In an embodiment, different templates for table functions and their respective AMDP implementation may be required depending on the system types involved (e.g. SAP ERP or Oracle ERP). This is because the same semantic information may, for example, have been stored in different database tables depending on the system type. In order to handle accessing data from multiple database schemas method 400 must maintain the system-specific schemas. Thus depending on the configuration data, method 400 may generate templates for multiple table functions and AMDP implementations.

At box 404, method 400 may use the configuration data to generate, for each involved system, explicit AMDP classes and/or table functions. Method 400 may activate each explicit AMDP class and/or table function so that they can be used immediately.

In an embodiment, method 400 may use an SQL function such as a "UNION" operation to define a cross view. In an embodiment, method 400 may access data from one system instance per system type (e.g. ERP or CRM) and subsequently may generate an explicit AMDP class based on the configuration data and the AMDP class template. In an embodiment, method 400 may replace the SQL Script coding reference to the database schema within the template with appropriate SQL script based on the configuration data.

In an embodiment, method 400 may access data from multiple system instances per system type. Thus, method 400 may generate a table function and AMDP implementation for each respective instance based on the configuration data. By way of non-limiting example, if two ERP and CRM systems are involved in the scenario at the customer side, method 400 may generate the following explicit table functions and AMDP implementations (as represented in SQL code):

| CDS Table Function | AMDP Implementation |
| --- | --- |
| DEFINE TABLE FUNCTION ERP1_SFlight .. IMPLEMENTED BY METHOD ERP1_SFlight_AMDP_CL=>getFlightInfos | CLASS ERP1_SFlight_AMDP_CL DEFINITION.. SELECT * FROM CustomerSchema1.SFLIGHT .. ENDCLASS. |
| DEFINE TABLE FUNCTION ERP2_SFlight .. IMPLEMENTED BY METHOD ERP2_SFlight_AMDP_CL=>getFlightInfos | CLASS ERP2_SFlight_AMDP_CL DEFINITION.. SELECT * FROM CustomerSchema3.SFLIGHT .. ENDCLASS. |
| DEFINE TABLE FUNCTION CRM1_SFlight .. IMPLEMENTED BY METHOD CRM1_SFlight_AMDP_CL=>getFlightInfos | CLASS CRM1_SFlight_AMDP_CL DEFINITION.. SELECT * FROM CustomerSchema2.SFLIGHT .. ENDCLASS. |
| DEFINE TABLE FUNCTION CRM2_SFlight .. IMPLEMENTED BY METHOD CRM2_SFlight_AMDP_CL=>getFlightInfos | CLASS CRM2_SFlight_AMDP_CL DEFINITION.. SELECT * FROM CustomerSchema4.SFLIGHT .. ENDCLASS. |

At box 405, method 400 may generate the explicit cross system view based on the explicit local views, table functions and AMDP implementations. By way of non-limiting example, the explicit cross view may be represented with SQL code as shown below:

"DEFINE VIEW CrossFlightData AS SELECT * FROM CustomerSchema1.ERP_SFlight UINION ALL SELECT * FROM CustomerSchema2.CRM_SFlight UNION ALL SELECT * FROM SAPSchema3.ERP_SFlight UINION ALL SELECT * FROM SAPSchema4.CRM_SFlight . . . ".

In an embodiment, method 400 may consume the views that make up the VDM and perform analytical functions using the VDM. Method 400 may use an analytical engine to perform analytical functions. Method 400 may consume views and evaluate the metadata of the views, especially the analytical annotations, to enable analytic functionality. Metadata may include behavioral components of the data, the manner in which the data is aggregated and how the data is displayed in the user interface among other aspects. Analytic functionality may be represented by application logic. Method 400 may receive application logic in the form of SQL script, or any other declarative and optimizable language for expressing application logic. Application logic may represent user defined functionality such as cross view defining, statistical analysis and hierarchy handling. Method 400 may compile the application logic into a calculation model, which may be accessed in the same manner as a database model. Therefore, the calculation model may be a kind of parameterized view capable of reuse. Examples of analytical functions that method 400 may undertake include statistical algorithms, planning operations and other special operations.

In an embodiment, method 400 may include client handling functionality. In some cases, source systems may contain data from several clients. Thus, when replicating, data pertaining to all clients may be stored in the same schema. This may result in the view for that schema containing data for multiple clients. Upon creating views for the data in a database environment, method 400 may determine which data relates to which client based on the client-element attribute associated with the data. However, although data for each respective client has a client identifier attribute, it may be difficult to determine which client data is relevant when defining cross views.

In an embodiment, method 400 may use cross views to expose the logical system for the involved systems. The logical system may represent the client and the source system instance as a concatenated identifier. Logical systems may be stored in a separate logical system table. Upon creating cross views, method 400 may enrich the cross views with the logical system for each source system by using an appropriate SQL operation such as "join" to combine the logical system table into the cross views resulting in views having a logical system attribute.

In an embodiment, customers may define authorizations based on the logical system attribute. In an embodiment, customers may define these authorizations within the application logic representing analytic functionality. Such authorizations may include a system type and a client id. Based on the authorizations, Method 400 may then restrict crossed views to the relevant clients of the involved systems based on the user defined parameters of the logical system attribute.

In an embodiment, method 400 may use the logical system attribute to differentiate records. Situations involving multiple instances of the same type of source system may result in different records having the same identification key. Therefore, reporting on cross views that union the records of the involved systems can result in incorrect values (e.g. aggregation of values with identification key of 1000). Method 400 may enrich the cross views with the logical system attribute for each source system (described herein) by using an appropriate SQL operation such as "join" to combine the logical system table into the cross views resulting in views having a logical system attribute.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method comprising:
    defining with a processor, a template for a cross view, wherein the cross view represents a minimum number of source system types involved in a system landscape, wherein a number and types of a plurality of source systems forming part of the system landscape are initially unknown;
    retrieving configuration data for the system landscape including an application logic for each source system, wherein
        the application logic represents at least one user-defined functionality, and
        at least one of the plurality of source systems comprises a different schema than other source systems;
    defining, for each source system, a view template based on the configuration data including the application logic;
    generating, for each source system, an explicit view based on the respective view template for the source system and the configuration data;
    generating an explicit cross view by integrating the explicit views generated for the plurality of source systems.

2. The method of claim 1, wherein the defining the view template comprises generating an Application Server Managed Database Procedure (AMDP) class template, and wherein there is only one source system of each source system type.

3. The method of claim 2, wherein the generating the explicit view comprises generating an explicit AMDP class.

4. The method of claim 1, wherein the defining the view template comprises generating an Application Server Managed Database Procedure (AMDP) class template and a table function template, and wherein there are multiple source systems of each source system type.

5. The method of claim 4, wherein the generating the explicit view comprises generating an explicit AMDP class and an explicit table function.

6. The method of claim 1, wherein the configuration data comprises a number of each type of system involved.

7. The method of claim 1, further comprising generating a logical system for each source system, and differentiating data from the plurality of source systems based on the logical system for each source system.

8. A system comprising:
    one or more source systems, each comprising at least one data processor and memory and containing one or more application database tables;
    a replication unit comprising at least one data processor and memory, configured to load data from one or more of the source systems to a database environment and in response to a modification in the data of a source system, replicate the modified data from that source system to the database environment; the database environment comprising a database, configured to receive and store data;
    an application server comprising at least one data processor and memory and configured to:
        define a template for a cross view, wherein the cross view represents a minimum number of source system types involved in a system landscape, wherein a number and types of a plurality of source systems forming part of the system landscape are initially unknown;
        retrieve configuration data for the system landscape including an application logic for each source system, wherein
            the application logic represents at least one user-defined functionality, and
            at least one of the plurality of source systems comprises a different schema than other source systems;
        define, for each source system, a view template based on the configuration data including the application logic;
        generate, for each source system, an explicit view based on the respective view template for the source system and the configuration data;
        generate an explicit cross view by integrating the explicit views generated for the plurality of source systems.

9. The system of claim 8, wherein the defining the view template comprises generating an Application Server Managed Database Procedure (AMDP) class template, and wherein there is only one source system of each source system type.

10. The system of claim 9, wherein the generating the explicit view comprises generating an explicit AMDP class.

11. The system of claim 8, wherein the defining the view template comprises generating an Application Server Managed Database Procedure (AMDP) class template and a table function template, and wherein there are multiple source systems of each source system type.

12. The system of claim 10, wherein the generating the explicit view comprises generating an explicit AMDP class and an explicit table function.

13. The system of claim 8, wherein the configuration data comprises a number of system instances of each system type involved.

14. The system of claim 8, further comprising generating a logical system for each source system, and differentiating data from the plurality of source systems based on the logical system for each source system.

15. A non-transitory computer program product storing instructions which, when executed by at least one data processor forming part of at least one computing system, result in operations comprising:
    defining a template for a cross view, wherein the cross view represents a minimum number of source system types involved in a system landscape, wherein a number and types of a plurality of source systems forming part of the system landscape are initially unknown;
    retrieving configuration data for the system landscape including an application logic for each source system, wherein
        the application logic represents at least one user-defined functionality, and
        at least one of the plurality of source systems comprises a different schema than other source systems;
    defining, for each source system, a view template based on the configuration data including the application logic;
    generating, for each source system, an explicit view based on the respective view template for the source system and the configuration data;
    generating an explicit cross view by integrating the explicit views generated for the plurality of source systems.

16. The computer program product of claim 15, wherein the defining the view template comprises generating an Application Server Managed Database Procedure (AMDP) class template, and wherein there is only one source system of each source system type.

17. The computer program product of claim 16, wherein the generating the explicit view comprises generating an explicit AMDP class.

18. The computer program product of claim 15, wherein the defining the view template comprises generating an Application Server Managed Database Procedure (AMDP) class template and a table function template, and wherein there are multiple source systems of each source system type.

19. The computer program product of claim 18, wherein the generating an explicit view comprises generating an explicit AMDP class and an explicit table function; and wherein the operations further comprise:
    generating a logical system for each source system, and differentiating data from the plurality of source systems based on the logical system for each source system.

20. The computer program product of claim 15, wherein the configuration data comprises a number of each type of system involved.

* * * * *